May 9, 1944.　　　　E. J. CAYO　　　　2,348,606
METHOD AND APPARATUS FOR MAKING ARTIFICIAL DENTURES
Filed Sept. 20, 1940　　　4 Sheets-Sheet 1
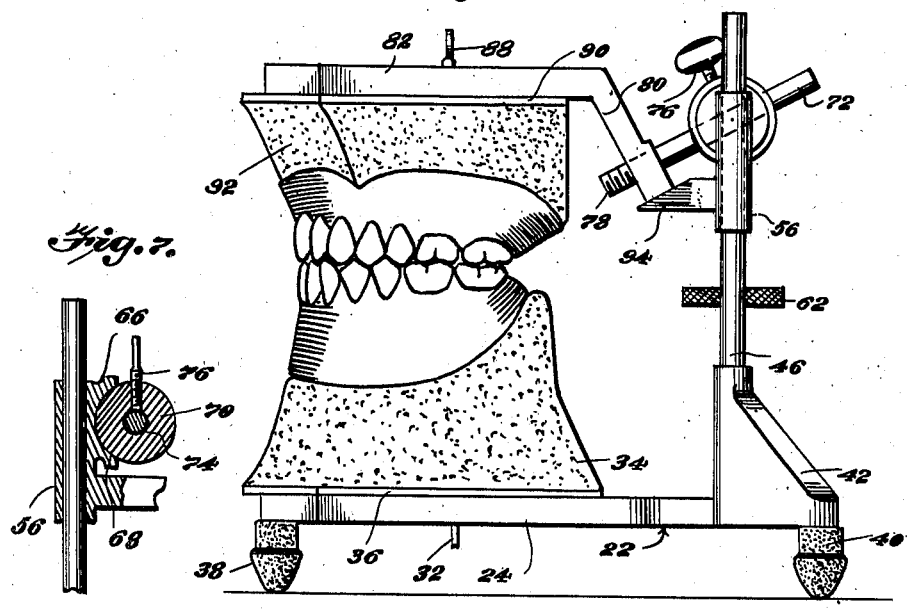
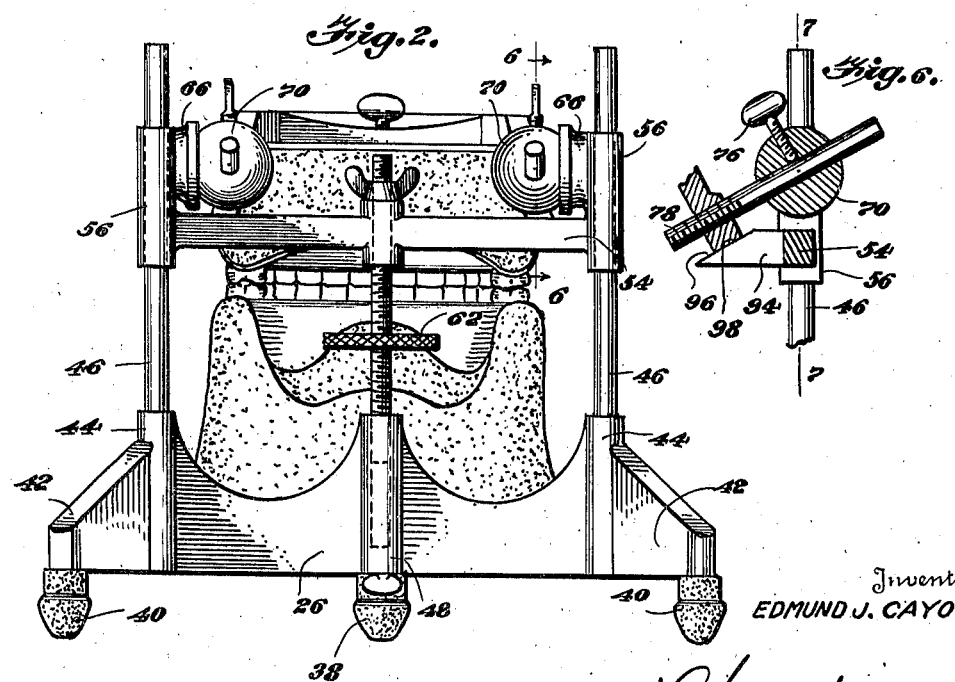
Inventor
EDMUND J. CAYO

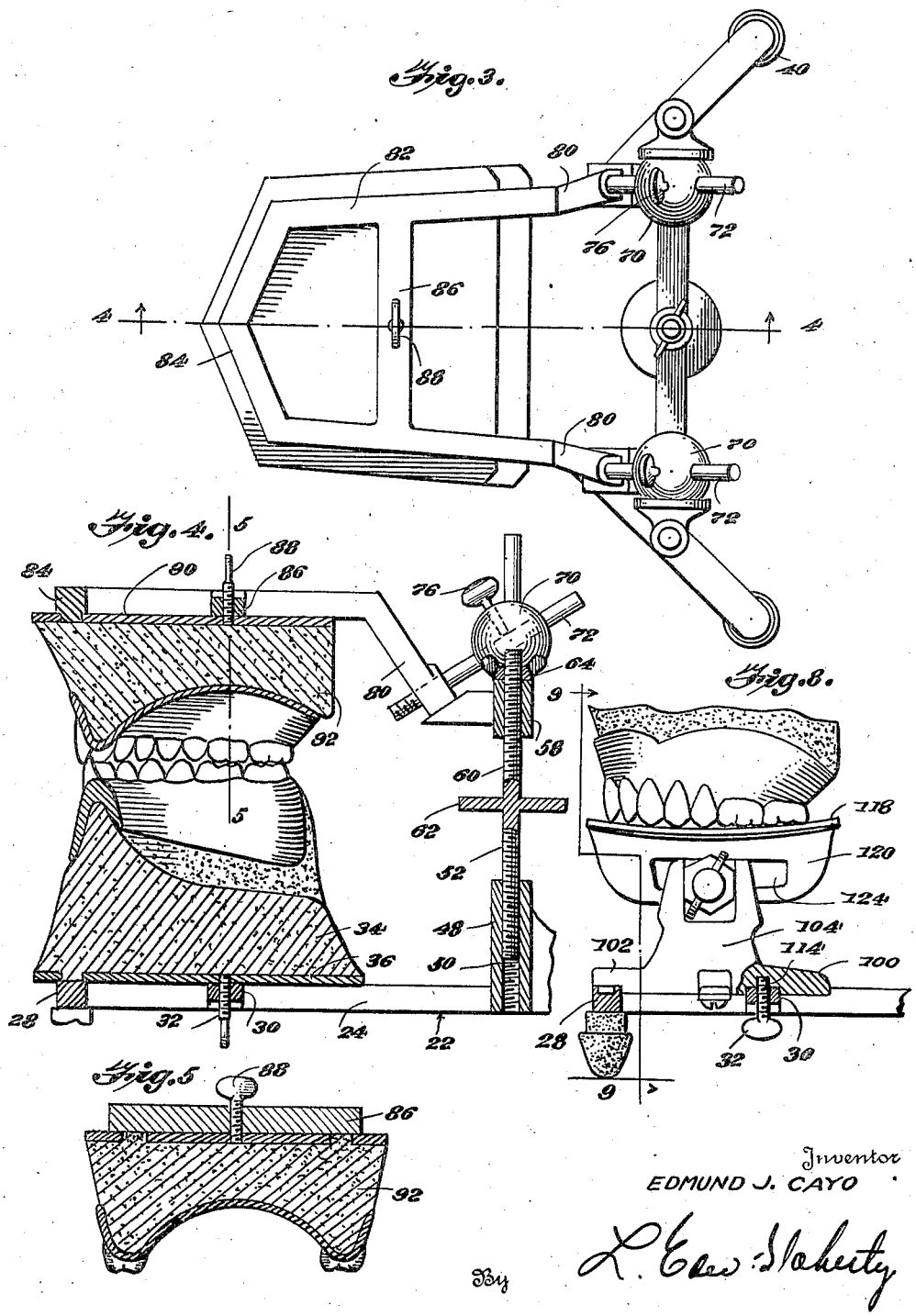

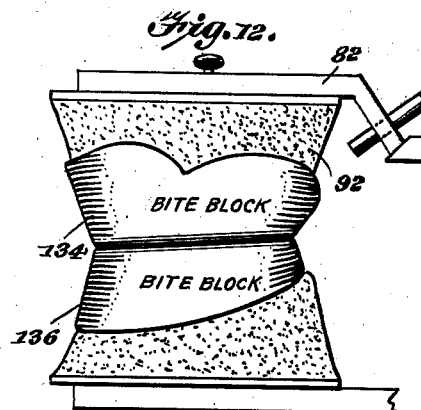
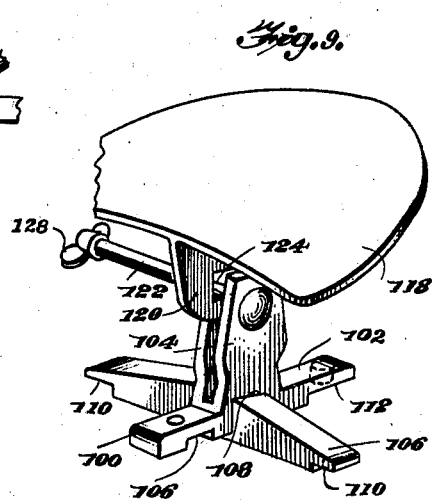
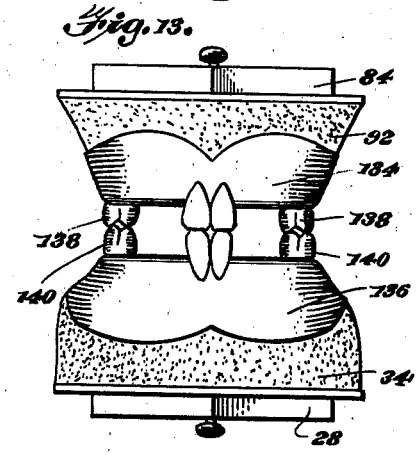
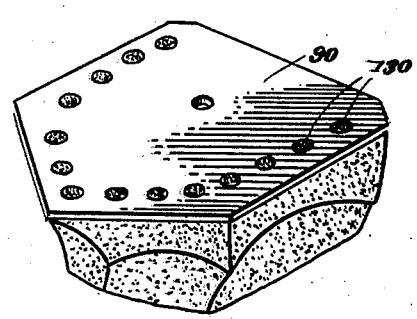
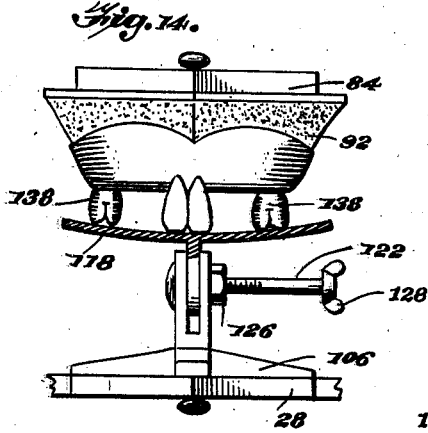
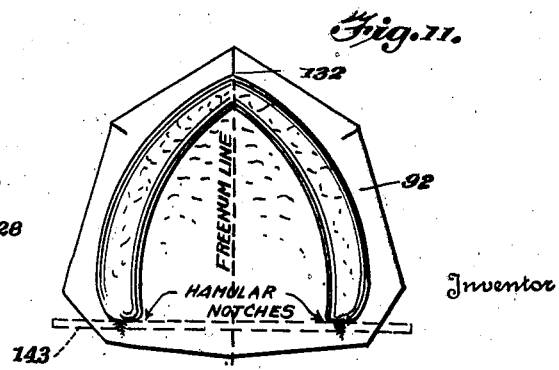

May 9, 1944.    E. J. CAYO    2,348,606
METHOD AND APPARATUS FOR MAKING ARTIFICIAL DENTURES
Filed Sept. 20, 1940    4 Sheets-Sheet 4
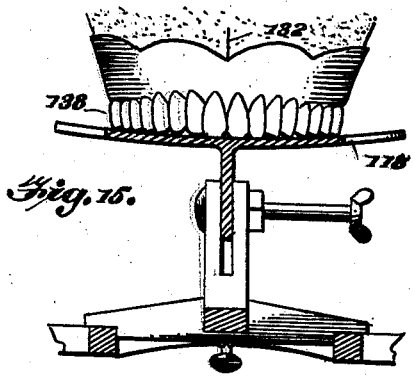
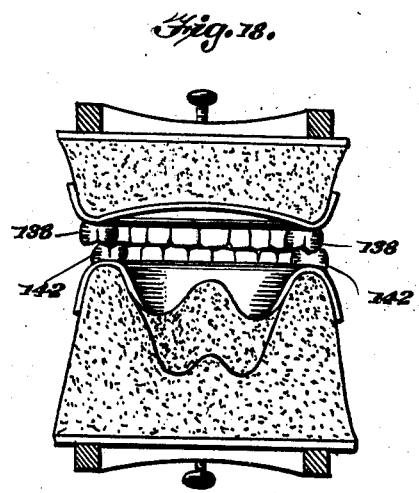
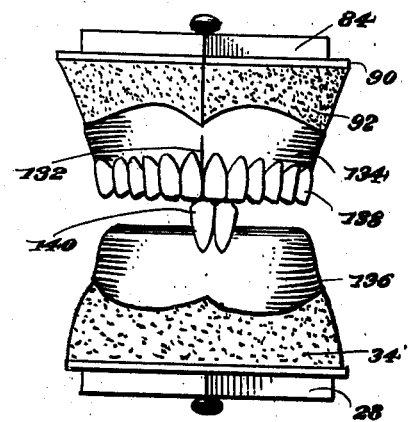
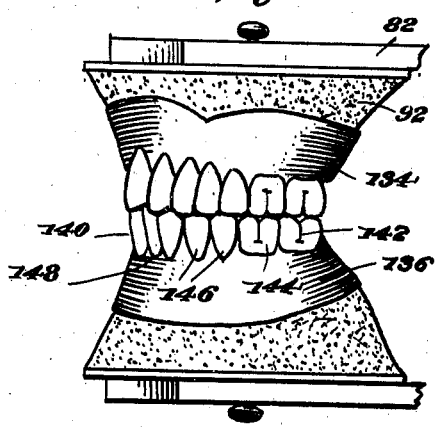
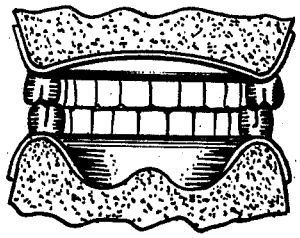
Inventor
EDMUND J. CAYO
By
Attorney Patented May 9, 1944

2,348,606

UNITED STATES PATENT OFFICE 2,348,606

METHOD AND APPARATUS FOR MAKING ARTIFICIAL DENTURES

Edmund J. Cayo, Albany, N. Y.

Application September 20, 1940, Serial No. 357,647

1 Claim. (Cl. 32—32)

The present invention relates to a method and an apparatus for making and fitting artificial dentures.

The primary object of the present invention is to reproduce mandibular and maxilliary artificial dentures for use in edentulous mouths.

A further object of the invention is to prepare artificial dentures by a series of consecutive steps to produce the correct masticating movement in the finished denture wherein the cusps and sulci will assume the proper positions during movement on an orbital condyle fulcrum.

A still further object of the invention is to provide an articulator to be used in connection with the above method for determining the correct location of the artificial dentures and establishing central occulsion between the maxillary and mandibular dentures.

A still further object of the invention is to provide a template having exact line of Spee and a horizontal plane of articulation to correspond to the condyle orbital plane of the patient's mouth so that the artificial dentures, when completed, will be easily applicable to the patient's gums and will restore the exact lines of the face.

A still further object of the invention is to provide an articulator of the above mentioned character in which the upper, or maxillary, model is mounted for movement on a spherical condyle fulcrum and is capable of lateral excursions to properly set the first and last molars with respect to the mandibular model.

A still further object of the invention is to provide an articulator in which the height of the teeth may be accurately measured and the maxillary model carrying the upper set of teeth may be adjusted in a vertical plane to compensate for irregularities in the heights of the teeth.

Other objects and advantages of the invention will become apparent during the course of the following description taken in connection with the accompanying drawings wherein Figure 1 is a side elevational view of an improved articulator used in the embodiment of the invention.

Figure 2 is a rear elevational view further illustrating the improved articulator, showing the method of arranging the teeth in the models.

Figure 3 is a top elevational view, illustrating the manner in which the upper maxillary plate is mounted.

Figure 4 is a longitudinal vertical cross-sectional view taken on line 4—4 of Figure 3, looking in the direction of the arrows illustrating in detail the construction of the articulator and showing the spherical condyle fulcrum members.

Figure 5 is a vertical cross-sectional view taken on line 5—5 of Figure 4, showing the manner in which the movable maxillary member is connected to the dental model.

Figure 6 is a vertical cross-sectional view taken through one of the spherical supporting members further showing the spherical condyle fulcrum and a limit stop therefor.

Figure 7 is a vertical cross-sectional view taken on line 7—7 of Figure 6 at right angles thereto, showing the manner in which the spherical fulcrum members are supported.

Figure 8 is a side elevational view partly broken away to illustrate the template employed for determining the line of Spee.

Figure 9 is a perspective view of the template, showing the same removed from the articulator.

Figure 10 is a perspective view of a plaster model, showing the backing plate therefor.

Figure 11 is a top elevational view of a precast model employed in the process involving this invention.

Figure 12 is a diagrammatic view, illustrating the manner in which the models are arranged with respect to the articulator for determining the correct orbital plane of the patient's mouth.

Figure 13 is a diagrammatic view, illustrating the first step of the method for producing dentures in accordance with this invention.

Figure 14 is a diagrammatic view, illustrating the second step.

Figure 15 is a view of the template, illustrating diagrammatically the manner of forming the third step incident to the process.

Figure 16 is a diagrammatic view, illustrating the fourth step.

Figure 17 is a diagrammatic view, illustrating the fifth step and showing the teeth set in their respective positions.

Figure 18 is a diagrammatic view, illustrating the maxillary member moved to the left for determining the position and correct location of the bicuspids and molars.

Figure 19 is a diagrammatic view, showing the maxillary member moved to the right to obtain correct positioning of the bicuspids and molars during the final steps of the method, and Figure 20 is a diagrammatic view illustrating the position of the molars in their normal position.

In the accompanying drawings wherein for the purpose of illustration there is shown a preferred embodiment of the method and apparatus for carrying out the purpose of the invention and wherein like reference numerals designate corresponding parts throughout the same, reference character 22 generally designates the base of an articulator having a pair of side frame bars 24 secured at the rear to a transverse web portion 26 and connected at the opposite end by a frame bar 28. Spanning the side frame bars 24 intermediate the ends thereof is an anchoring bar 30 through which extends a wing screw 32 for the purpose of anchoring the mandibular model 34 by extending into the base plate thereof 36.

A supporting foot 38 is carried by the forward end of the articulator base 12, while the rear portion of the articulator is supported by feet 40 connected to obliquely extending arms 42 connecting the rear web member 26.

Tubular screw threaded bosses 44 are formed integral with the frame bars 24 and rear web 26 having internally screw threaded openings for receiving vertical guide bars 46.

Formed intermediate the ends of the web 26 is an intermediate boss 48 having an internally screw threaded bore 50 for receiving the lower end of an adjusting screw 52 for moving and adjusting the maxillary member of the articulator which will be described in detail in the following paragraphs.

Slidably mounted on the guide rods 46 is a cross-head 54, the ends of which are provided with tubular guide members 56 for guiding the cross-head 54 in a vertical path. Formed integrally with the cross-head 54 is a tubular boss 58 having reverse screw threads for receiving the oppositely threaded end 60 of the adjusting screw 52. A thumb wheel 62 is carried by the adjusting screw 52 so that rotation thereof will raise or lower the cross-head 54 until the same is adjusted to the desired position whereby the adjusting screw 52 may be locked by means of a wing nut 64 threaded on the upper end of the reverse screw threaded portion 60 above the tubular boss 58.

Each of the tubular guide members 56 are provided with projections 66 having formed therein spherical recesses 68 for receiving spherical fulcrum members 70 carried by the maxillary model plate of the articulator. The spherical recesses 68 are arranged in opposed relation for receiving the spherical fulcrum members 70 which are carried in a slidable manner upon angularly disposed rods 72 extending through openings 74 formed in the spherical fulcrum members. A set screw 76 is threaded in the spherical fulcrum for anchoring the rod 72 in position. The opposite end of the rod 72 is threaded as at 78 and is received in an angle portion 80 of the maxillary frame member 82. Converging frame bars 84 connect the forward end of the maxillary frame, while an intermediate frame bar 86 connects the frame bars 82 between the ends thereof. A wing screw 88 extends through the intermediate frame bar 86 so that the anchor plate 90 of the maxillary model 92 may be removably secured thereto.

Formed integrally with each of the slide guides 56 is a projecting limit stop 94 having a beveled surface 96 for engaging the free end 98 of the angular frame bars 80, whereby downward movement of the maxillary member will be limited below a predetermined horizontal plane.

The articulator also includes a template, as shown in Figures 8 and 9, for positioning upon the articulator after the removal of the mandibular member or model 34. The template includes a base member having a rearwardly projecting wing 100 and a forwardly projecting wing 102 projecting from a bifurcated member 104. A cross arm 106 is keyed to the base of the template and is seated in a notch 108 formed therein. The free ends of the cross arm 106 are cut-away as at 110 for receiving the side bars 24 of the articulator frame, while the rearwardly extending wing 100 is undercut as at 112 for receiving the intermediate cross arm 30 so that the anchoring screw 32 may pass upwardly into a threaded opening 114. The forward projecting wing 102 is similarly undercut as at 116 for receiving the front frame bar 28.

Adjustably mounted between the bifurcated base member 104 is a template 118 having a central wing 120 which extends between the bifurcated base member 104 and is held in place by means of an adjusting bolt 122 which extends through an elongated slot 124 formed therein. When the adjusting screw 122 is drawn up tightly, the central wing 120 is locked between the bifurcated base members 104 in the desired location. A nut 126 is threaded on the adjusting screw 122 for effecting the clamping action and a thumb piece 128 is provided for rotating the screw.

The upper surface of the template 118 is slightly concaved so that the teeth may be set in accordance with the anatomical line of Spee which is the generation of a curved surface having a radius of approximately four inches.

It will thus be observed that the template shown in Figures 8 and 9 may be substituted for the mandibular model 34 while obtaining the correct position of the teeth in the maxillary member. In the formation of artificial dentures, it is necessary for the dentist to obtain a model of the patient's gum which is done by taking an impression with wax or the like and forming maxillary and mandibular models therefrom of plaster of Paris. In producing a model such as is shown in Figures 10 and 11 which represents the maxillary member 92, the metal plate 90 is secured thereto and anchored by the plaster of Paris passing through openings 130. At the time the model is formed it is marked, as shown in Figure 11, along the median line so that, when forwarded to the dental machinist, it may be correctly set in the articulator in accordance with graduations thereon. The dentist, at the time of obtaining a model, also procures maxillary and mandibular bite bocks 134 and 136 which are formed of wax, or the like, and accompany the models when forwarded to the dental machinist. This practice enables the dental machinist to obtain correct settings in order to establish central occlusions between the built up models.

This invention comprises a method of setting the molars, cuspids, lateral and central incisors of the maxillary and mandibular members and after the models and bite blocks have been assembled in the articulator to produce the proper occlusion, as shown in Figure 12, the central incisors and molars 138 and 140 are positioned in the wax bite blocks 134 and 136 as well as the molars 138 and 140, as shown in Figure 13. Numerous methods of inserting teeth are employed and if desired, the maxillary member 134 may be set first so that the incisors and rear molars will properly align with the lower bite block 136, after which the central incisors and molars may be inserted in the lower bite block whereby the correct length of teeth desired may be easily ascertained.

When the models 34 and 92 have been placed in position and adjusted and before the teeth have been inserted, the level of the apparatus may be determined by placing a bar 143 through the Hamular notches of the models so that it is parallel with the plane of the work surface upon which the articulator is placed, this procedure is common practice.

The central incisors and molars of the maxillary and mandibular members having been set in the wax bite blocks 134 and 136, constitute the first step of the method and provide a starting point for setting the teeth in accordance with this invention.

In the next step, the mandibular member is removed, as shown in Figure 14, and the template is placed in lieu thereof to obtain the true line of Spee by moving the molars so that the same will touch the template surface 118 the template may be moved forward or rearward by reason of the pin and slot connection 122 and 124. During the setting of the molars 138, the central incisors are not moved out of their original position as this would result in irregularities along the maxillary ridge. In performing the second step, care should be given to the movement of the molars so that the cusps will evenly engage the template.

In the third step of the process, as shown in Figure 15, the lateral incisors and cuspids are inserted in position between the central incisors and molars so that they are evenly aligned with respect to the template surface.

When the teeth have all been set in the maxillary member it is elevated out of the way by swinging the same on the spherical condyle members 70, whereby, the template is removed from the articulator and the mandibular member is positioned, as shown in Figure 16, so that the two central incisors of the maxillary member are offset from the lower central incisors and the Freenum line intersects one of the lower central incisors 140.

In the fourth step, the maxillary model is moved laterally by swinging the same on the spherical fulcrum members 70 by releasing the set screws 76 engaging the rods 72. After the maxillary member has been moved to register the Freenum line 132 with one of the lower central incisors 140, the set screws 76 are lightened and the fifth step of the method may be proceeded with. It is only necessary, to swing the maxillary model laterally two or three degrees, which movement would be allowed at the spherical condyle connections in view of the fact that the spherical condyle members would move slightly less than one degree.

During the fifth, and final step, as shown diagrammatically in Figure 17, and after all of the mandibular cuspids and molars are positioned in the bite block 136, including the lower last molars 142, first molar 144, bicuspids 146, and cuspid 148 so that they will seat longitudinally with respect to the maxillary teeth, as shown in Figure 17, wherein the cusps of one set of teeth will project into the sulci of the other set, the first and last molars 144 and 142, respectively, in the mandibular member, should appear as shown in Figure 18 so that the upper right last molar 138 is in direct central alignment with the lower last molar 142 and the left upper last molar 138 is offset from the lower left last molar 142. This condition is brought about by setting the lower left molar 138 so that it is in direct alinement with the upper left molar and by releasing the set screws 76 of the spherical fulcrum members so that the maxillary member can be moved to the right so that the Freenum line 132 is in intersecting relation with the two central incisors 140 and not in an offset position as shown in Figure 16.

Slight excursions of the maxillary members to the right or left, as shown in Figures 18 and 19, will allow the molars and cuspids to be correctly positioned so that, when one side of upper and lower molars are in direct alinement, the other side will be offset and when moved to a normal centered position, as shown in Figure 20, which is the position the reproduced dentures will assume in a patient's mouth the upper and lower molars of the right and left sides will locate so that the cusps of one set will enter the sulcis of the other and produce a normal and correct masticating action in the patient's mouth.

After the teeth have thus been set in the maxillary and mandibular members they are reproduced in the usual vulcanite plates and the teeth assume the same position in the finished plate as were set in the wax bite models. After vulcanization, in the usual manner known in the art, the artificial dentures may be placed in the patient's mouth, requiring but slight alterations as are present in grinding operations.

It is to be understood, that the form of the invention herewith shown and described is to be taken as a preferred embodiment thereof and that various changes in the shape, size, and arrangement of parts may be resorted to without departing from the spirit of the invention or the scope of the subjoined claim.

What I claim is:

An articulator, comprising a base, a pair of vertical standards secured to one end of the base, anchoring means carried by the base for receiving a mandibular denture model, a pair of slide guides mounted on the vertical standards, a cross-head connecting the slide guides, screw adjusting means for the cross-head, spherical socket members arranged on the slide guides in opposed relation, spherical condyle fulcrums mounted in the sockets, an adjustable rod extending through the axis of each spherical fulcrum and a maxillary denture model carried on the free ends of the adjustable rods.

EDMUND J. CAYO.